United States Patent
Miller

(10) Patent No.: US 7,448,251 B2
(45) Date of Patent: Nov. 11, 2008

(54) METHOD FOR PREPARING A MOTOR VEHICLE FOR A CRASH TEST

(75) Inventor: Ryan Miller, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 11/326,118

(22) Filed: Jan. 5, 2006

(65) Prior Publication Data

US 2006/0174689 A1 Aug. 10, 2006

Related U.S. Application Data

(60) Provisional application No. 60/641,509, filed on Jan. 6, 2005.

(51) Int. Cl.
*G01M 7/00* (2006.01)

(52) U.S. Cl. .................... 73/12.01; 73/12.04; 73/865.3; 73/865.6

(58) Field of Classification Search ................ 73/12.01, 73/12.04, 865.3, 865.6
See application file for complete search history.

(56) References Cited

U.S. PATENT DOCUMENTS

| | | | | |
|---|---|---|---|---|
| 4,796,913 A | * | 1/1989 | Amabile et al. | ............. 280/751 |
| 4,906,020 A | * | 3/1990 | Haberer | ....................... 280/749 |
| 5,513,878 A | | 5/1996 | Ueda et al. | |
| 5,880,381 A | * | 3/1999 | Sathe | ........................ 73/865.6 |
| 6,292,728 B1 | | 9/2001 | Masegi | |
| 6,448,890 B1 | * | 9/2002 | Cooper | ....................... 340/438 |
| 6,647,331 B2 | | 11/2003 | Imai et al. | |
| 6,657,539 B2 | | 12/2003 | Yamamoto et al. | |
| 6,662,092 B2 | * | 12/2003 | Wang et al. | .................... 701/45 |
| 6,696,933 B2 | * | 2/2004 | Cooper | ....................... 340/438 |
| 6,955,391 B1 | * | 10/2005 | Peng | ....................... 296/146.6 |
| 6,983,638 B2 | * | 1/2006 | Yetukuri et al. | ............ 73/12.04 |
| 7,216,557 B2 | * | 5/2007 | David et al. | ................ 73/865.9 |
| 2003/0018421 A1 | * | 1/2003 | Cooper | ......................... 701/45 |
| 2003/0062711 A1 | * | 4/2003 | Fischer et al. | ............ 280/728.3 |
| 2004/0211612 A1 | * | 10/2004 | Muller | ........................ 180/271 |
| 2006/0175807 A1 | * | 8/2006 | Miller et al. | ............. 280/728.1 |

OTHER PUBLICATIONS

Charles J. Kahane, Ph.D, An Evaluation of Occupant Protection in Frontal Interior Impact for Unrestrained Front Seat Occupants of Carts and Light Trucks, NHTSA Technical Report No. DOT HS 807 203, Jan. 1988.*

* cited by examiner

*Primary Examiner*—Edward Lefkowitz
*Assistant Examiner*—Freddie Kirkland, III
(74) *Attorney, Agent, or Firm*—Plumsea Law Group, LLC; Mark E. Duell

(57) ABSTRACT

A method for preparing a motor vehicle for a crash test is disclosed. The method subjects the motor vehicle to a sequence of different tests and provides a system of staged modifications that can be made to help the motor vehicle pass the current test without invalidating test results obtained earlier in the sequence. In some cases, this method can be used to confirm that a particular motor vehicle qualifies for a certain crash test routine.

23 Claims, 9 Drawing Sheets

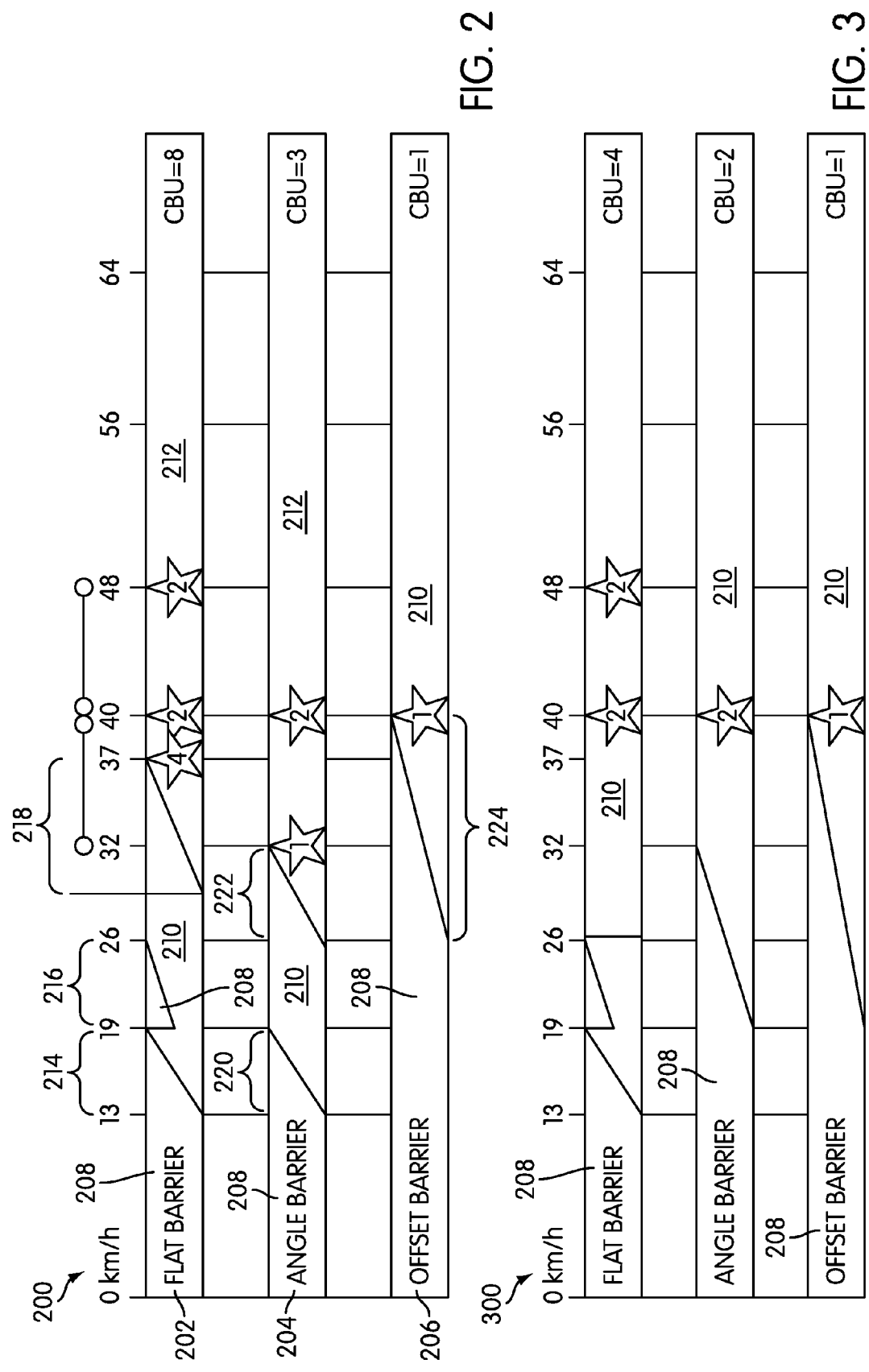

FIG. 4

| 208 TEST MATRIX | | 32km/h | | 37km/h | | 40km/h | | 48km/h | | 56km/h | | 64km/h | |
|---|---|---|---|---|---|---|---|---|---|---|---|---|---|
| | | DELAY | NO DELAY | DELAY | NO DELAY | DELAY | NO DELAY | DELAY | NO DELAY | DELAY | NO DELAY | DELAY | NO DELAY |
| FLAT BARRIER NO BELT | AF5 DR | | | ☆ | ① | ☆ | | | | | | | |
| | AF5 PA | | | ☆ | | ☆ | | | | | | | |
| | AM50 DR | | | ☆ | ② | ☆ | | | ③ | | | | |
| | AM50 PA | | | ☆ | | ☆ | | ☆ | | | | | |
| FLAT BARRIER BELTED | AF5 DR | | | ☆ | ⑤ | | | ☆ | ④ | | | | |
| | AF5 PA | | | ☆ | | | | ☆ | ⑦ | | | | |
| | AM50 DR | | | ☆ | ⑥ | | | ☆ | ⑧ | | | | |
| | AM50 PA | | | ☆ | | | | ☆ | | | | | |
| ANGLE BARRIER NO BELT | AM50 R30 DR | | | | | ☆ | ⑨ | | | | | | |
| | AM50 R30 PA | | | | | ☆ | | | | | | | |
| | AM50 L30 DR | | | | | ☆ | ⑩ | | | | | | |
| | AM50 L30 PA | | | | | ☆ | | | | | | | |
| ODB BELTED | AF5 DR | | | | | ☆ | ⑪ | | | | | | |
| | AF5 PA | | | | | ☆ | | | | | | | |
| | AM50 DR | ☆⑫ | | | | | | | | | | | |
| | AM50 PA | ☆⑫ | | | | | | | | | | | |

METHOD FOR PREPARING A MOTOR VEHICLE FOR A CRASH TEST

RELATED APPLICATIONS

This application claims the benefit of U.S. Provisional Patent Application No. 60/641,509, filed on Jan. 6, 2005, which is hereby incorporated by reference in its entirety.

BACKGROUND OF THE INVENTION

1. Field of the Invention

This invention relates to the field of motor vehicle restraint systems, and more particularly, to a method for crash testing a motor vehicle.

2. Related Art

Currently, some cars, trucks and vans provide some kind of supplemental restraint system (SRS). Often, these supplemental restraint systems take the form of inflatable devices or restraints. In some cases, airbags are used. The following related art references provide a general background of the field.

Cooper (U.S. Pat. No. 6,696,933) discloses an air bag system with a biomechanical grey zone. The biomechanical grey zone is an attempt to comply with recent legislative changes that require airbags to restrain women and children as well as adult males. To help restrain women and children, Cooper proposes the use of a system where air bags include multi-level inflators that can adjust the inflation characteristics of the air bag. The biomechanical zone is defined as a region where it is acceptable to deploy the air bag using either a low power inflator or a high power inflator. While the use of biomechanical grey zones may help to comply with new governmental requirements, the grey zones introduce uncertainty in the deployment characteristics of the air bag and this makes system design and testing difficult. The Cooper reference is incorporated by reference in its entirety.

Corrado et al. (U.S. Pat. No. 6,249,729) teaches an occupancy sensing system for an automobile. The system is used in conjunction with an airbag deployment system to determine the nature, location and motion parameters of an occupant within the vehicle interior. These parameters are determined by ultrasound and/or infrared sensors. The system establishes criteria for airbag disablement or for modified airbag deployment based on sensor information. In particular, Corrado teaches the use of a Keep Out Zone (KOZ) within the vehicle interior relative to the dashboard or instrument panel. Analyzing the relative location of an occupant with respect to the Keep Out Zone can be used to determine whether the airbag deployment is disabled or modified.

Wang et al. (U.S. Pat. No. 6,662,092) teaches a control method for deploying an air bag using fuzzy logic. Wang attempts to provide a fuzzy logic deployment system that is more direct than previous fuzzy logic systems and where the calibration process if more user friendly. The method uses a deployment control algorithm to determine whether certain stages are deployed based on certain thresholds related to predicted occupant movement and crash severity.

There is currently a need for a way to increase the predictability of the deployment of an inflatable restraint to improve occupant safety and to simplify the process of crash testing the motor vehicle.

SUMMARY OF THE INVENTION

A system and method for crash testing a motor vehicle is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

Generally, the related art teaches systems and methods for a single deployment event and focus on correctly making a single deployment decision. In contrast, one aspect of the present invention is directed to providing a novel deployment map that applies to a number of different deployment scenarios and conditions. This novel map can help improve the predictability of a deployment of an inflatable restraint, and this predictability can help designers and engineers improve occupant safety over a wide range of different collision scenarios and conditions. In another aspect, the present invention is directed to a method of qualifying a motor vehicle to use the novel deployment map.

In another aspect, the invention provides a method for qualifying a motor vehicle for a crash test routine comprising the steps of: determining whether the motor vehicle passes a first test related to a hypothetical child passenger; and altering the motor vehicle using a first stage of modifications if the motor vehicle fails the first test.

In another aspect, the invention provides a step of determining whether the motor vehicle passes a second test related to a passenger; and altering the motor vehicle using a second stage of modifications if the motor vehicle fails the second test; and wherein the second stage of modifications is different than the first stage of modifications.

In another aspect, the invention provides a step of determining whether the motor vehicle passes a third test related to an out of position passenger; and altering the motor vehicle using a third stage of modifications if the motor vehicle fails the third test; and wherein the third stage of modifications is different than the first stage of modifications and the second stage of modifications.

In another aspect, the invention provides a step of determining whether the motor vehicle passes a fourth test related to a crash test conducted at a first speed; and altering the motor vehicle using a fourth stage of modifications if the motor vehicle fails the fourth test; and wherein the fourth stage of modifications is different than the first stage of modifications, the second stage of modifications and the third stage of modifications.

In another aspect, the invention provides a step of determining whether the motor vehicle passes a fifth test related to a crash test conducted at a second speed; and altering the motor vehicle using a fifth stage of modifications if the motor vehicle fails the fifth test; wherein the second speed is greater than the first speed; and wherein the fifth stage of modifications is different than the first stage of modifications, the second stage of modifications, the third stage of modifications and the fourth stage of modifications.

In another aspect, the invention provides a step of determining whether the motor vehicle passes a sixth test related to a female crash test conducted at the second speed.

In another aspect, the invention provides a method for preparing a motor vehicle for a crash test routine comprising a first test and a second test, the first test producing first test results; wherein first stage modifications are available to help pass the first test; wherein second stage modifications are available to help pass the second test; and wherein the second stage modifications are different than the first stage modifications.

In another aspect, changes made using the second stage modifications maintain the validity of the first test results.

In another aspect, first stage modifications include modifying a shape of an instrument panel associated with the motor vehicle.

In another aspect, first stage modifications include modifying a first thigh contact point.

In another aspect, first stage modifications include modifying a height of a seat associated with the motor vehicle.

In another aspect, wherein first stage modifications can be made by optionally changing any one of the group consisting essentially of: modifying a shape of an instrument panel associated with the motor vehicle, modifying a first thigh contact point, and modifying a height of a seat associated with the motor vehicle.

In another aspect, wherein second stage modifications include moving a position of a knee bolster associated with the motor vehicle.

In another aspect, wherein second stage modifications include moving a position of a windshield associated with the motor vehicle.

In another aspect, wherein second stage modifications include adjusting a stiffness of a knee bolster associated with the motor vehicle.

In another aspect, wherein second stage modifications can be made by optionally changing any one of the group consisting essentially of: moving a position of a knee bolster associated with the motor vehicle, moving a position of a windshield associated with the motor vehicle, and adjusting a stiffness of a knee bolster associated with the motor vehicle.

In another aspect, wherein the first test includes determining whether a hypothetical child enters a No Good Zone.

In another aspect, wherein the No Good Zone is associated with a passenger side inflatable device.

In another aspect, wherein the second test includes determining whether a hypothetical male passenger clears a windshield associated with the motor vehicle.

In another aspect, the second test includes determining a pelvic stroke of a hypothetical male passenger.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 2 is a schematic diagram of a conventional firing map for an inflatable restraint.

FIG. 3 is a schematic diagram of a preferred embodiment of a firing map for an inflatable restraint.

FIG. 4 is a table of a series of crash tests when using a conventional firing map.

DETAILED DESCRIPTION OF THE PREFERRED EMBODIMENT(S)

Figure 1:
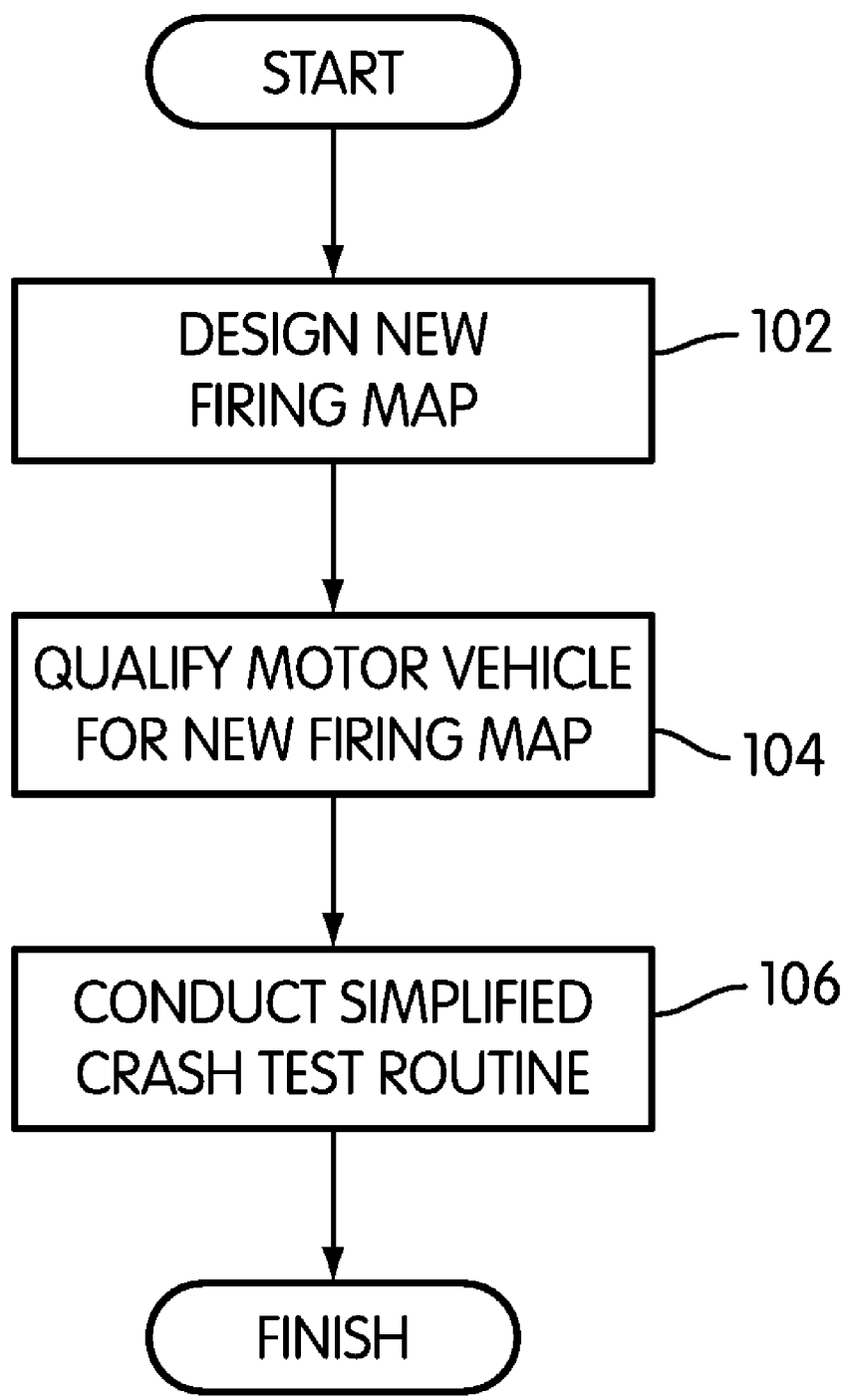
FIG. 1 is a schematic diagram of a preferred embodiment of a method for improving a crash test routine for a motor vehicle.

FIG. 1 is a flow diagram of a preferred embodiment of a method of improving a crash test regiment for a motor vehicle. The method shown in FIG. 1 can include the following steps. The method begins with step 102 where a new firing map is designed. This new firing map helps to simplify the firing conditions of an inflatable restraint and reduce occupant injury. The simplified algorithm or firing map can help make the deployment conditions of the inflatable restraint more predictable and this help provide a supplemental restraint system that is more reliable and easier to test. This predictability also helps designers improve occupant safety. Another benefit of the new firing map is that it can help reduce the number of vehicles required to comply with government-mandated crash tests. In some cases, this reduction is substantial.

After the new firing map has been designed, the method can proceed to step 104 where a motor vehicle is qualified for using the new firing map. In step 104, the process helps to identify which motor vehicles can accept the new map and can also help tune or modify a motor vehicle so that it can become a motor vehicle capable of using the new firing map.

After the motor vehicle has been qualified to use the new firing map, the motor vehicle is then subjected to a simplified crash test routine in step 106. Preferably, step 106 includes the process of actually conducting real world crash tests with actual motor vehicles and crash test dummies.

FIG. 2 is a schematic diagram of a conventional firing map 200 for an inflatable restraint. The conventional firing map 200 includes three deployment scenarios depending on the type of impact. The three types of impact are a conventional flat barrier scenario 202, a conventional angled barrier scenario 204 and a conventional offset barrier scenario 206. In each of the scenarios, the conventional firing map 200 also deploys the inflatable restraints differently depending on the speed of the impact. Generally, conventional firing map 200 considers the speed of the impact and the type of impact to determine how or if the inflatable restraint is deployed.

In the conventional flat barrier scenario 202, conventional firing map 200 includes three different deployment options, which are related to corresponding regions in the bar graph representing conventional flat barrier scenario 202. The first deployment option is a no fire option and this first option occurs in region 208. A second deployment option is a delay fire option, and this second option occurs in region 210. The third deployment option is a simultaneous fire option that occurs in region 212.

Generally, inflatable restraint systems can include two charges, a low power charge and a high power charge. The high power charge is generally designed to provide a low energy deployment that is suitable for smaller and less massive occupants, for example, a woman with physical characteristics similar to an AF5% crash test dummy. The low power charge is generally used to supplement the energy of the high power charge, and when these two charges are deployed simultaneously, they produce a high energy deployment that is suitable for larger and more massive individuals, for example, a male with physical characteristics similar to an AM50% crash test dummy.

A delay deployment can be conducted in many different ways. The system can delay deploying the inflatable restraint in the following ways: the system can immediately deploy the high power charge and delay deploying the low power charge, the system can delay first and then deploy the two charges simultaneously, or the system can deploy the low power charge immediately and delay deploying the high power charge. In a simultaneous deployment, the system deploys both the low power charge and the high power charge at the same time to inflate the restraint very quickly.

In some embodiments, a simultaneous deployment can include a slight delay. In these embodiments, the high power charge is initially deployed, and then a slight delay is provided. This delay can be used to provide the system with a little more time to decide whether to deploy the second low power charge. In some cases, the system has determined that the high power charge needs to be deployed. The slight delay can be used to retrieve information from other sensors or perform other computations. These steps can be used by the system to decide whether to also deploy the low power charge. This slight delay can range from about 0 to 10 milliseconds and in an exemplary embodiment, the delay is about 5 milliseconds.

The conventional firing map 200 includes transition zones between two adjacent deployment regions. Considering conventional flat barrier 202, a first transition zone 214 is disposed between first region 208 and second region 210. This first transition zone 214 is bounded, on the low speed end, at about 13 km/h and on the high speed end at about 19 km/h.

This first transition zone 214 determines the deployment characteristics for the inflatable restraint where the passenger or driver is unbelted. First transition zone 214 graphically represents the percentage chance between first region 208 and second region 210. In conventional map 200, first region 208 corresponds to a no fire condition and second region 210 corresponds to a delay fire condition. Thus, first transition zone 214 graphically represents the percentage chance that the inflatable device will either not deploy (no fire) or will deploy in a delay mode.

As shown in FIG. 2, at the low end of first transition zone 214, the bar graph representing the conventional flat barrier scenario 202 is almost completely represented by first region 208. This means that there is almost a 100% chance that the deployment condition associated with first conventional region 208 will occur. Since first conventional region 208 represents a no fire condition, there virtually no chance that the inflatable device will deploy at the low end of first transition zone 214.

At the opposite end of first transition zone 214, at about 19 km/h, the bar graph representing first scenario 202 is almost completely represented by second region 210. Since second region 210 corresponds to a delay fire condition, it is virtually assured that inflatable restraint will deploy in a delay fire mode. At speeds between 13 km/h and 19 km/h, there is a generally linear relationship between speed and the likelihood that the inflatable device will be deployed in a delay mode. Generally, as speed increases, it becomes more and more likely that the inflatable restraint will be deployed in a delay mode.

Conventional flat barrier scenario 202 also includes a second transition zone 216. This second transition zone 216 extends from a low end of about 13 km/h to a high end of about 26 km/h. In order to accurately show first transition zone 214, FIG. 2 shows only a portion of second transition zone 216, the slope of which should continue until 13 km/h. This second transition zone relates to a belted occupant, either driver or passenger. Second transition zone 216 provides the probability that the inflatable device will either not deploy or will deploy in a delay mode. Again, like first transition zone 214, the percentage chance of either a no fire condition or a delay fire condition is graphically related to ratio of the first region 208 compared to the second region 210 at a given speed.

Conventional flat barrier scenario 202 includes a third transition zone 218. This third transition zone 218 is disposed between second region 210 and third region 212 and provides the percentage chance of either a delay mode deployment or a simultaneous deployment.

Third transition region starts at about 30 km/h and extends to about 37 km/h. Similar to the first and second transition regions, third transition region 218 provides a percentage chance that the inflatable device will deploy in accordance with the pattern associated with second region 210 or third region 212. Recall that second region 210 is associated with a delay fire condition and third region 212 is associated with a simultaneous fire condition. Because of these associations, third transition zone 218 graphically represents the percentage chance that an inflatable device will deploy in a delay fire mode or a simultaneous fire mode.

As shown in conventional flat barrier scenario 202, the percentage chance that the inflatable device will deploy in a simultaneous fire mode increases as the speed of the impact increases. At about 37 km/h, it is a virtual certainty that the inflatable device will deploy in a simultaneous mode and at speeds above 37 km/h, the inflatable device is designed to deploy in simultaneous mode.

Conventional angle barrier scenario 204 includes three regions, first region 208, second region 210 and third region 212 corresponding to three different deployment patterns for an inflatable restraint. Conventional angle barrier scenario 204 includes a fourth transition zone 220 disposed between first region 208 and second region 210. Fourth transition zone 220 extends from a low end of about 13 km/h to a high end of about 19 km/h.

Fourth transition zone 220 is similar to first transition zone 214. As shown in FIG. 2, at the low end of fourth transition zone 220, the bar graph representing the angle barrier scenario 204 is almost completely represented by first conventional region 208. This means that there is almost a 100% chance that the deployment condition associated with first conventional region 208 will occur. Since first conventional region 208 represents a no fire condition, there virtually no chance that the inflatable device will deploy at the low end of fourth transition zone 220.

At the opposite end of fourth transition zone 220, at about 19 km/h, the bar graph representing second scenario 204 is almost completely represented by second region 210. Since second region 210 corresponds to a delay fire condition, it is virtually assured that inflatable restraint will deploy in a delay fire mode. At speeds between 13 km/h and 19 km/h, there is a generally linear relationship between speed and the likelihood that the inflatable device will be deployed in a delay mode. Generally, as speed increases, it becomes more and more likely that the inflatable restraint will be deployed in a delay mode.

Conventional angle barrier scenario 204 also includes a fifth transition zone 222 disposed between second region 210 and third region 212. This fifth transition zone 222 extends from a low end of about 26 km/h to a high end of about 32 km/h and provides the percentage chance of either a delay mode deployment or a simultaneous deployment.

Fifth transition zone 222 starts at about 26 km/h and extends to about 32 km/h. Similar to other transition zones, fifth transition zone 222 provides a percentage chance that the inflatable restraint will deploy in accordance with the pattern associated with second region 210 or third region 212. Recall that second region 210 is associated with a delay fire condition and third region 212 is associated with a simultaneous fire condition. Because of these associations, fifth transition zone 222 graphically represents the percentage chance that an inflatable restraint will deploy in a delay fire mode or a simultaneous fire mode.

As shown in conventional angle barrier scenario 204, the percentage chance that the inflatable device will deploy in a simultaneous fire mode increases as the speed of the impact increases. At about 32 km/h, it is virtual assured that the inflatable restraint will deploy in a simultaneous mode and at speeds above 32 km/h, the inflatable restraint is designed to deploy in simultaneous mode.

Conventional offset barrier scenario 206 includes two regions, first region 208 and second region 210. Conventional offset barrier scenario 206 does not include a third region. Sixth transition zone 224 is disposed between first region 208 and second region 210. Sixth transition zone 224 is larger than some other transition zones and extends from about 26 km/h to about 40 km/h.

As shown in FIG. 2, at the low end of sixth transition zone 224, the bar graph representing the offset barrier scenario 206 is almost completely represented by first conventional region 208. This means that there is almost a 100% chance that the deployment condition associated with first conventional region 208 will occur. Since first conventional region 208 represents a no fire condition, there virtually no chance that the inflatable restraint will deploy at the low end of sixth transition zone 224.

At the opposite end of sixth transition zone 224, at about 40 km/h, the bar graph representing offset barrier scenario 206 is almost completely represented by second region 210. Since second region 210 corresponds to a delay fire condition, it is virtually assured that inflatable restraint will deploy in a delay fire mode. At speeds between 26 km/h and 40 km/h, there is a generally linear relationship between speed and the likelihood that the inflatable device will be deployed in a delay mode. Generally, as speed increases, it becomes more and more likely that the inflatable restraint will be deployed in a delay mode.

Government rules generally require motor vehicles to undergo crash testing at certain speeds and under certain conditions. Currently, there are two government regulation zones, a first regulation zone between 32 km/h to 40 km/h for unbelted occupants and a second regulation zone between 0 km/h and 48 km/h for belted occupants. Motor vehicles sold in the United States must be subjected to a number of crash tests to establish passenger and occupant safety in these regulation zones in the event of a collision.

While transition zones have been used in the past as a way to decide how to deploy an inflatable restraint, they also introduce a number of problems. Deployments that occur within transition zones are unpredictable because the transition zones only provide percentage chances of two competing deployment conditions. In some cases, the response of a system using conventional firing map 200 is so unpredictable that it is possible for an inflatable restraint to deploy two different ways in two successive and identical crash tests.

Because the deployment of an inflatable restraint is unpredictable in a transition zone, the system must be tested at the government mandated speeds as well as at all endpoints of the transition zone.

In order to minimize the number of crash tests, engineering reasoning is generally used and a worst case scenario is tested. Using engineering reasoning, if a motor vehicle passes a crash test conducted under the worst case, then it can be assumed that the motor vehicle will also pass a crash test at under less severe conditions. This is one way to validate the response of the system under many different possible conditions. For example, if a motor vehicle passed a crash test at 40 km/h, engineering reasoning dictates that the same motor vehicle, identically prepared and equipped, should pass the same crash test at 35 km/h. In fact, the motor vehicle should also pass the same crash test at any speed between 0 and 40 km/h.

Referring to FIG. 4, which is a table of crash tests for conventional firing map 200, and FIG. 2, the crash tests that are required can be observed. The crash tests are preferably conducted in sets, and each set preferably includes a driver and a passenger. Set 1 is conducted at a speed of 37 km/h and with a flat barrier collision condition. Set 1 is used to test the occupant safety of a typical female and an AF5% crash test dummy (which stands for American Female 5 percentile) can be used to model the behavior of a hypothetical female occupant. Set 1 is an unbelted test, meaning seat belts are not used during the test.

Set 2 is similar to set 1 except that set 2 is used to test the occupant safety of a typical male and an AM50% crash test dummy (which stands for American Male, 50 percentile) can be used to model the behavior of a hypothetical male. The conditions and attributes of the remaining eleven sets of crash tests are self-explanatory from the table shown in FIG. 4.

FIG. 3 is a schematic diagram of a preferred embodiment of firing map 300. It has been discovered that with careful design of motor vehicle 100, the simultaneous fire mode is not necessary to provide occupant safety and also meet government crash test requirements. In other words, it is possible to use a delay fire mode to meet government crash test requirements under conditions where conventional systems use a simultaneous fire mode.

This discovery can be used to create a firing map 300 that is less complex than conventional firing map 200. It is believed that this discovery will help to improve occupant safety because the reduction in the complexity of the new firing map 300 compared to the conventional firing map 200 can provide more predictable deployments of inflatable devices. This improved predictability can, in turn, be used to better understand the interplay between occupants and the inflatable restraint system at various different speeds and collision conditions. This can help engineers design safer motor vehicles and inflatable restraint systems. As a side benefit, this discovery also allows the locations of the various transition zones to be selected to prevent overlap with one or more government regulation zones.

Also, because a simultaneous fire mode is no longer required, this entire deployment mode can be omitted from firing map 300. In the embodiment shown in FIG. 4, firing map 300 does not include a simultaneous deployment or firing condition. Firing map 300 includes just two deployment patterns, a no fire mode and a delayed deployment mode.

Figure 5:
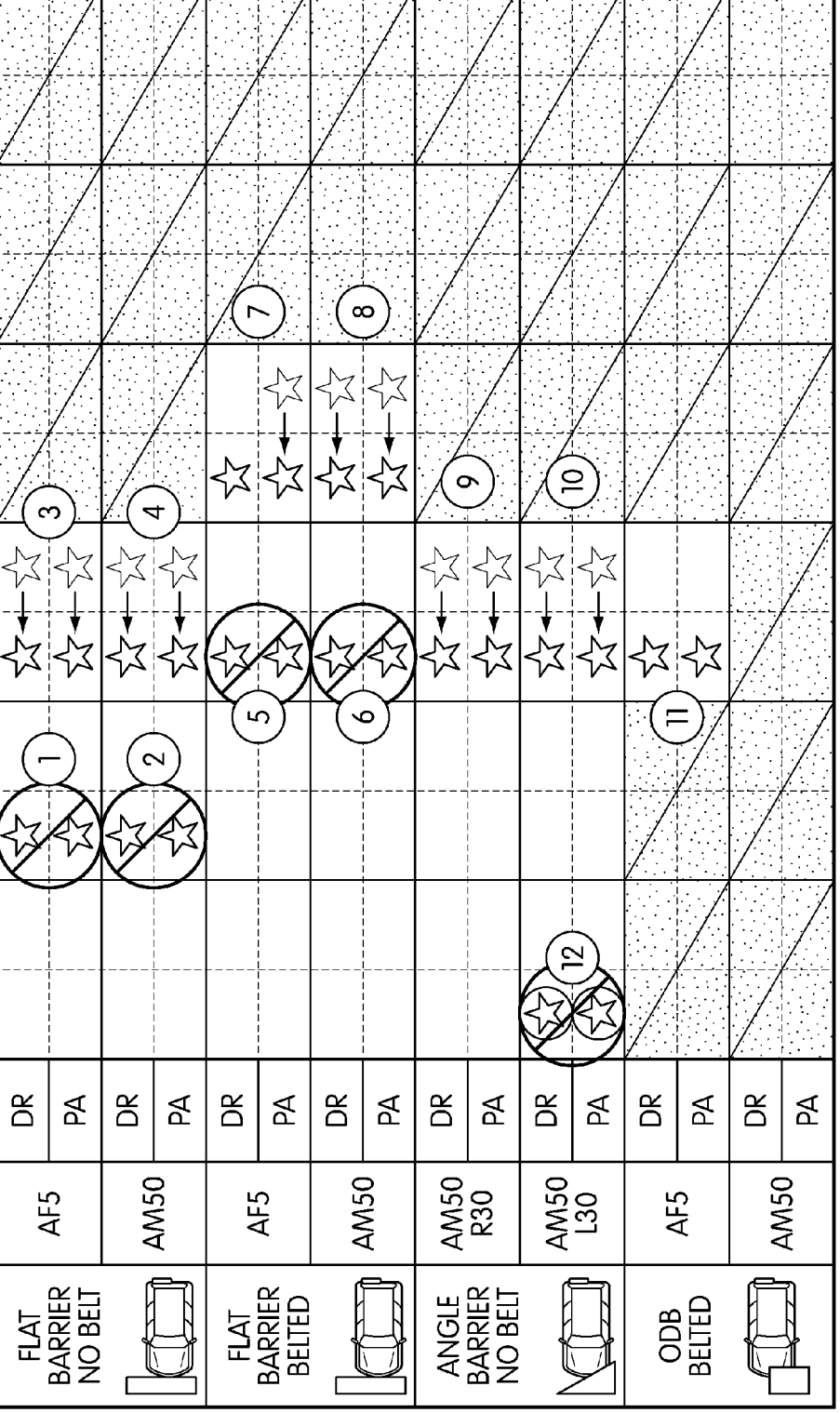
FIG. 5 is a table of a series of crash tests when using a preferred embodiment of a firing map.

Preferably, the various transition zones are carefully selected so that none of the transition zones overlaps a regulation zone. In one embodiment shown in FIG. 3, the transition zones have been moved away or separated from the regulation zones. This allows the crash test routine to be greatly simplified. Referring to FIG. 5, which is a table of crash tests corresponding to firing map 300 reflected in FIG. 3, differences between this table and the table shown in FIG. 4 are readily apparent.

As shown in FIG. 5, several crash tests are no longer needed. Set 1 is no longer needed because set 3 is conducted at 40 km/h under the same conditions, namely in delay mode. Note the arrows indicating that new set 3 is conducted in delay mode from the previous no delay mode. As discussed earlier, if a motor vehicle passes a crash test at a higher speed, then it can be assumed that the motor vehicle will pass the same crash test at a lower speed. Because the new firing map 300 uses the same deployment conditions at 40 km/h and 37 km/h, any motor vehicle using new firing map 300 that passes the 40 km/h crash test should also pass set 1 as well. For the same reasons, sets 2, 5, 6 and 12 are no longer required.

Figure 6:
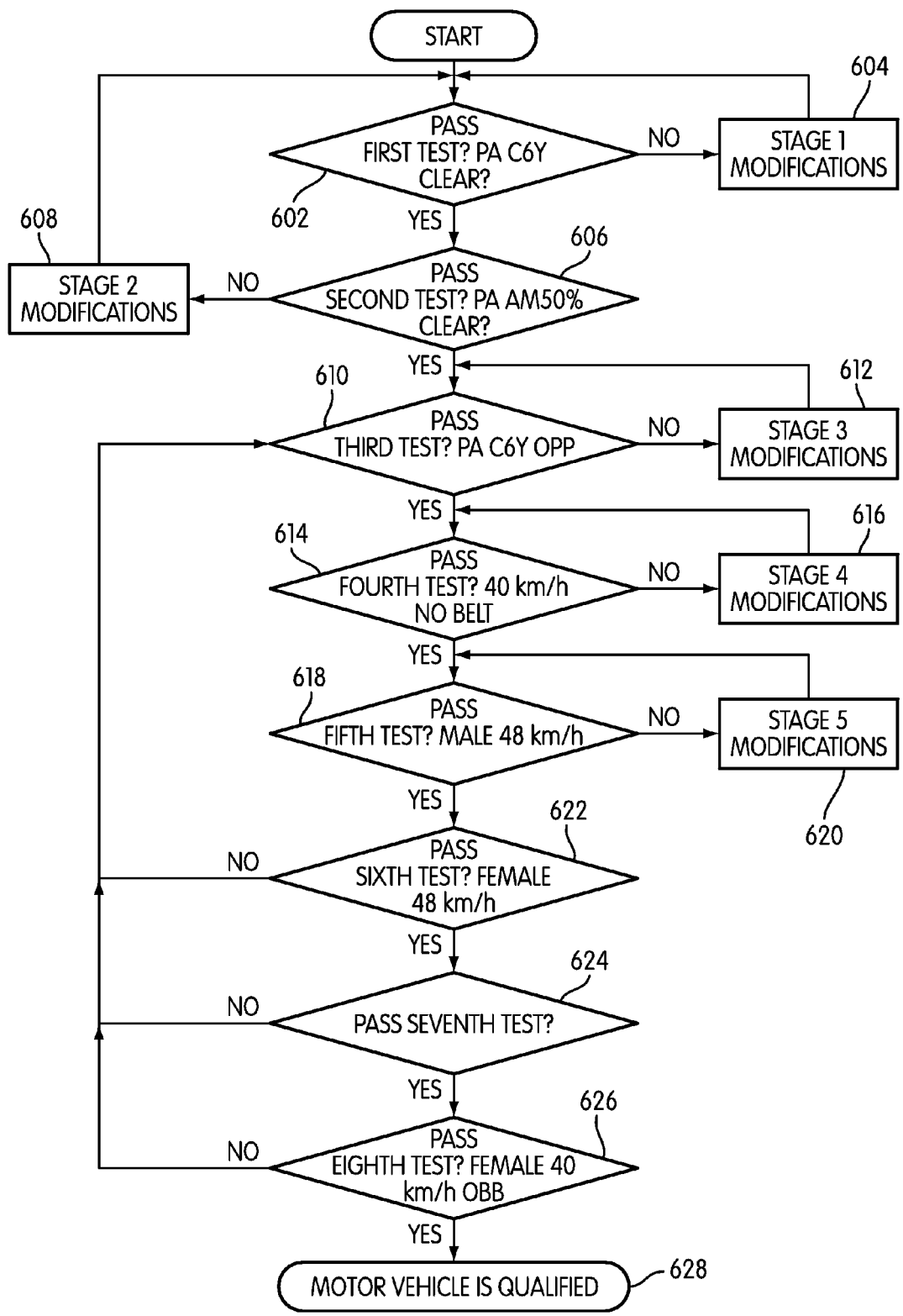
FIG. 6 is a flow diagram of a preferred embodiment of a method for qualifying a motor vehicle for a crash test routine.

Returning to FIG. 1, some embodiments include provisions 104 to determine if a motor vehicle is qualified to use new firing map 300. Although many different methods can be used to determine if a motor vehicle is qualified to use new firing map 300, the following method is preferred. Referring to FIG. 6, which is a flow diagram of a preferred embodiment of a method 104 for determining if a motor vehicle is qualified to use new firing map 300, this method can both determine if a motor vehicle is qualified to use new firing map 300 and also help modify or "tune" the motor vehicle so it becomes qualified to use new firing map 300.

Method 104 can include a number of different tests and a number of modifications that can be made to help the motor vehicle to pass those tests. Preferably, these tests and modifications are arranged sequentially within method 104 in a systematic way so that a modification does not invalidate previous test results.

Figure 10:
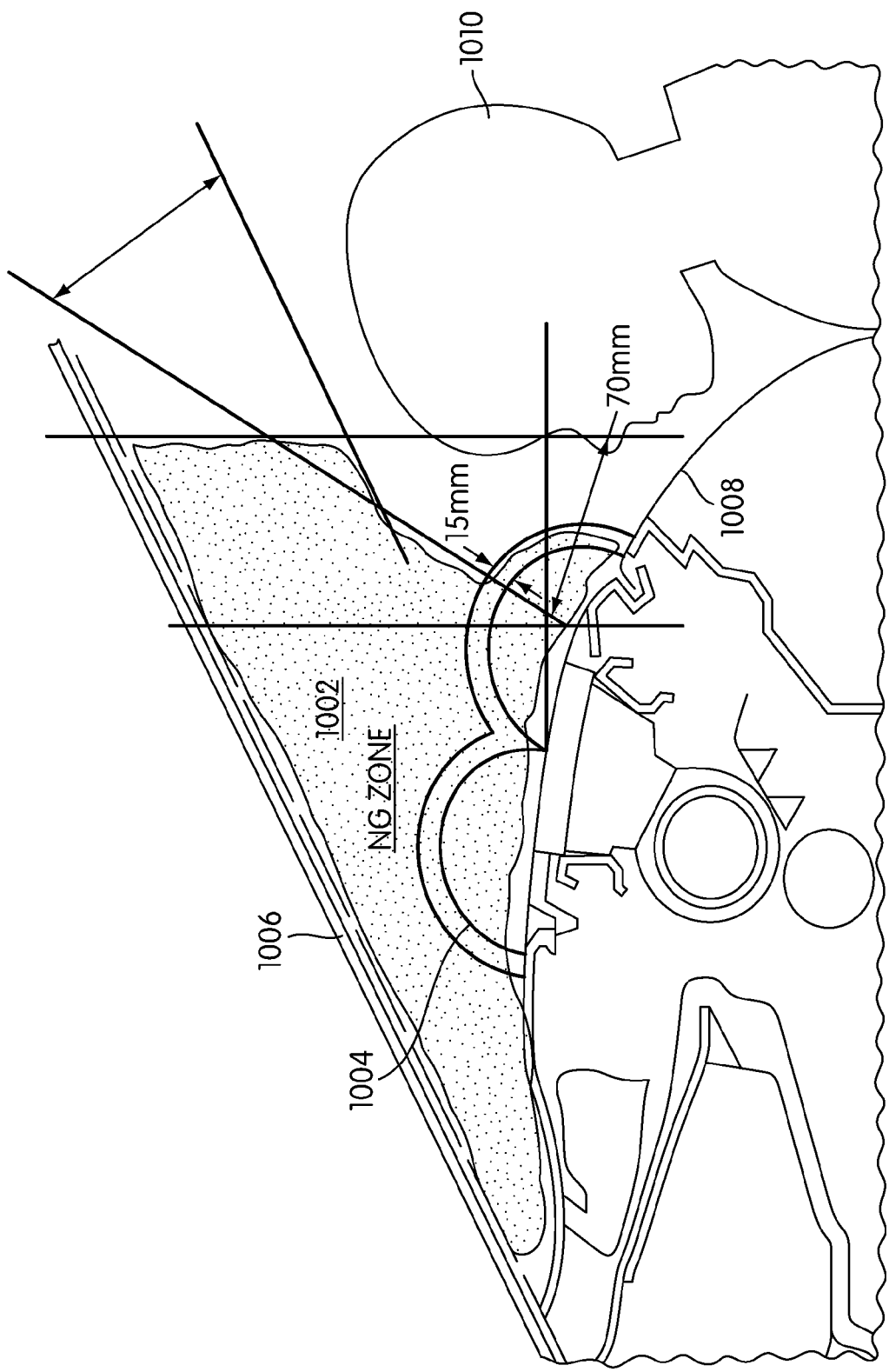
FIG. 10 is a schematic diagram of a preferred embodiment of a No Good Zone.

Preferably, method 104 begins with first test 602. In first test 602, the relative position of a hypothetical child with respect to a No Good Zone ("NGZ") 1002 is considered. In some cases, a C3Y (child, three year old) and/or C6Y (child, six year old) dummy is used to model the hypothetical child. Referring to FIG. 10, NGZ 1002 is a zone roughly between inflatable restraint lid 1004 and windshield 1006. In some embodiments, NGZ 1002 is defined using particular relative offsets and spacing from various components.

In a preferred embodiment, NGZ 1002 is defined by one or more boundaries. These boundaries are preselected or predefined distances from various objects or lines. In the embodiment shown in FIG. 10, inflator module 1020 includes an inflator center line 1022. In some embodiments, a boundary is established based on inflator center line 1022. In the embodiment shown in FIG. 10, inflator center line boundary 1026 is defined as a boundary that is parallel and spaced from inflator center line 1022. The distance can be varied, however, any distance of about 30 mm to 200 mm can be used. In an exemplary embodiment, inflator center line boundary 1026 is disposed about 70 mm away from inflator center line 1020 towards or into the passenger cabin of motor vehicle 100.

Inflator module 1020 can also include an edge 1024. In some embodiments, a boundary is established based on inflator edge 1024. In the embodiment shown in FIG. 10, inflator edge boundary 1028 is defined as a boundary that is vertical and horizontally spaced from inflator edge 1024. The distance can be varied, however, any distance of about 30 mm to 200 mm can be used. In an exemplary embodiment, inflator edge boundary 1028 is disposed about 70 mm away from inflator edge 1024 towards or into the passenger cabin of motor vehicle 100.

In some embodiments, a boundary can be established based on windshield 1006. In the embodiment shown in FIG. 10, windshield boundary 1030 is defined as a boundary that is roughly parallel to windshield 1006. The distance between windshield 1006 and windshield boundary 1030 can be varied, however, any distance of about 50 mm to 300 mm can be used. In an exemplary embodiment, windshield boundary 1030 is disposed about 100 mm away from windshield 1006 towards or into the passenger cabin of motor vehicle 100.

In some embodiments, a boundary can be established based on inflator lid 1004. In the embodiment shown in FIG. 10, the arc or range of motion of the inflator lid is indicated by 1004. A lid boundary 1032 is defined as a locus of points equally spaced from arc 1004 and disposed outward or away from inflator module 1020. The distance between inflator lid 1004 and lid boundary 1032 can be varied, however, any distance of about 1 mm to 50 mm can be used. In an exemplary embodiment, lid boundary 1032 is disposed about 10 mm away from arc 1004 towards or into the passenger cabin of motor vehicle 100.

One or more of these various different boundaries can be used to establish NGZ 1002. In an exemplary embodiment, shown in FIG. 10, all of the above boundaries are used. However, other embodiments may use more or less boundaries to establish NGZ 1002.

Referring to FIG. 6, if the hypothetical child passenger is clear of NGZ 1002, then the process moves on to step 606. However, if the hypothetical child passenger does not clear NGZ 1002, then the process moves to step 604.

Figure 7:
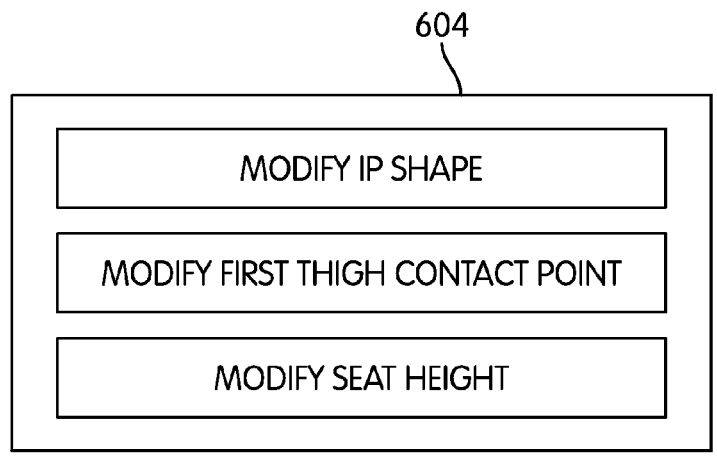
FIG. 7 is an enlarged schematic diagram of a preferred embodiment of step 604 of FIG. 6.

FIG. 7 is an enlarged view of step 604, and one or more of the modifications shown in FIG. 7 can be made to help motor vehicle 100 pass first test 602. One option is to modify the Instrument Panel (IP) 1008 shape. The shape of IP 1008 can be extended into the passenger cabin to help prevent entry of the hypothetical child in to NGZ 1002. Another option is to modify the shape of first thigh bolster or first contact point. Another option is to modify the passenger seat height and/or angle. One or more of these options can be used to prevent the hypothetical child occupant from entering NGZ 1002.

Figure 13:
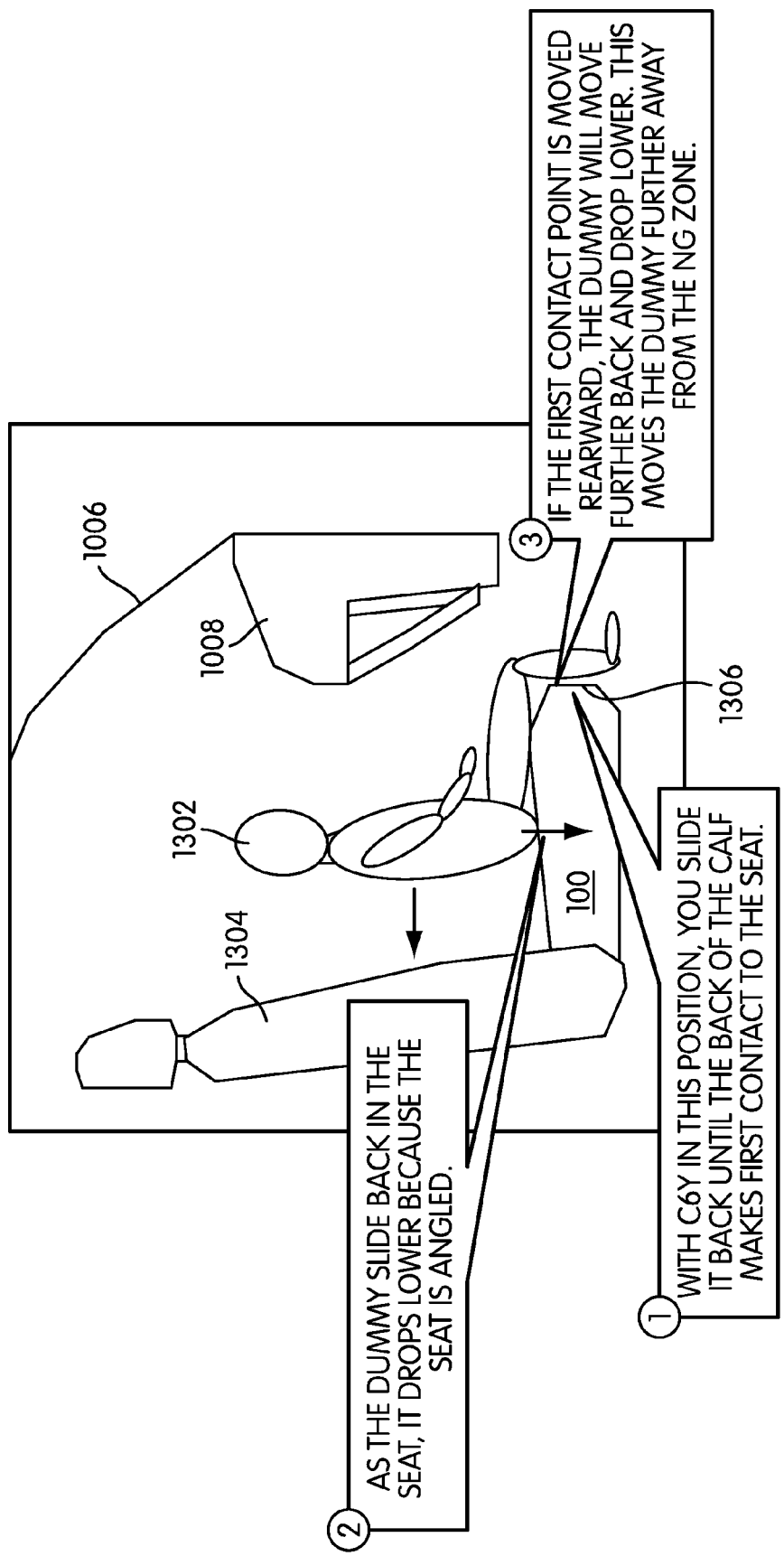
FIG. 13 is a schematic diagram of a preferred embodiment of an out of position child.

Some of these modifications can be seen in FIG. 13, which is a schematic diagram of a motor vehicle interior and an out of position child 1302. Motor vehicle interior includes a seat 1304. The forward edge 1306 of seat 1304 generally serves as the first contact point for child 1302. As shown schematically in FIG. 13, the location of forward edge 1306 and/or the angle of seat 1304 can be modified to help motor vehicle 100 pass first test 602.

After these modifications are made, the process returns to first test 602 until it has been confirmed that the hypothetical child does not enter NGZ 1002.

Figure 11:
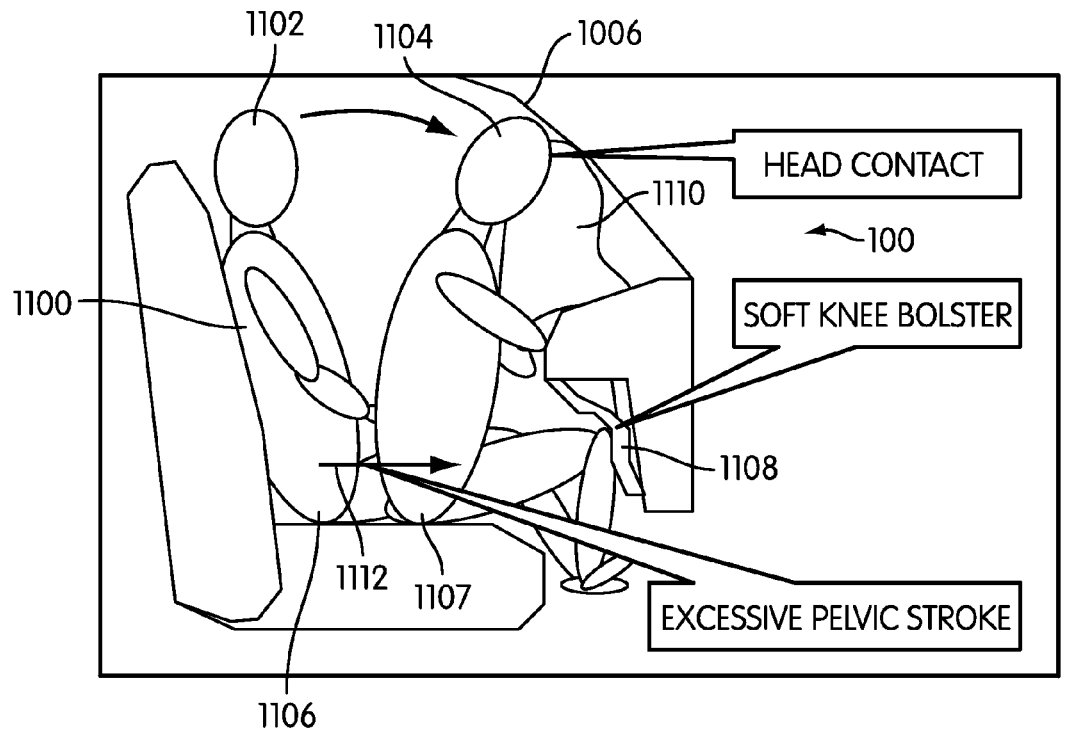
FIG. 11 is a schematic diagram of a failed crash test.
Figure 12:
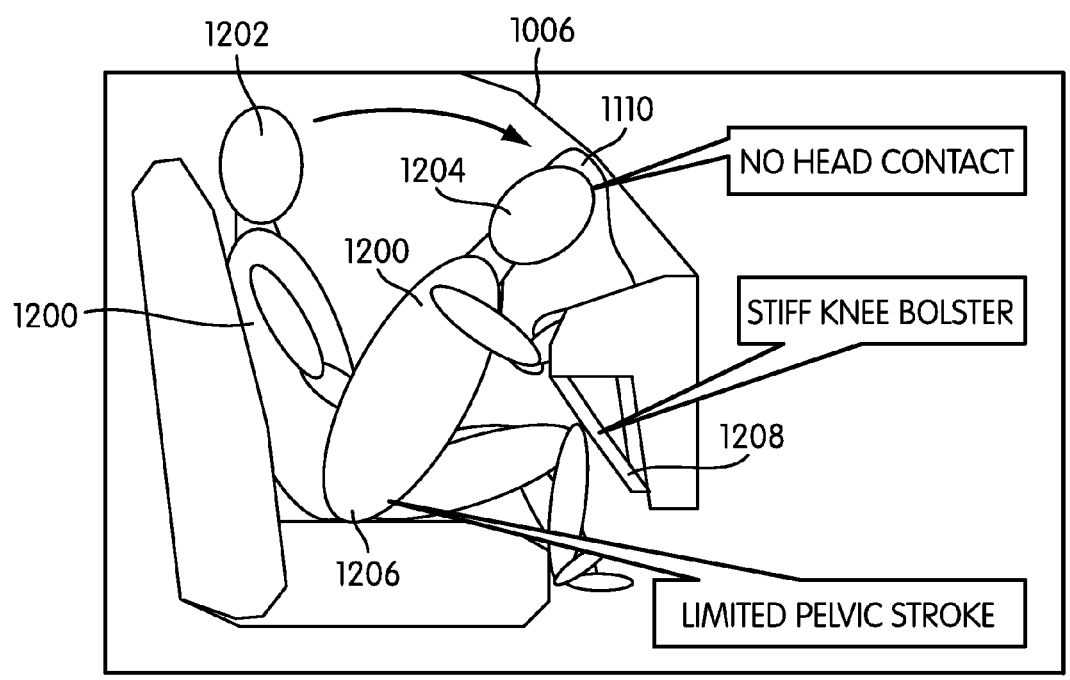
FIG. 12 is a schematic diagram of a preferred embodiment of a crash test that has been passed.

After this has been confirmed, the process moves on to step 606, the second test, where the process determines whether or not the kinematic arc of an average male passenger will strike windshield 1006. FIGS. 11 and 12 are schematic diagrams of examples demonstrating contact with windshield 1006 and clearance of windshield 1006, respectively. In some cases, an AM50% crash test dummy (which stands for American Male, 50 percentile) is used in second test 606. Referring to FIG. 11, crash test dummy 1100 is in a first position 1102 prior to the collision and is in a second position 1104 after the collision. As shown in FIG. 11, crash test dummy 1100 contacts windshield 1006 in second position 1104. It can also be observed that the pelvis 1105 of crash test dummy 1100 moves from a first position 1106 to a second position 1107 as indicated by arrow 1112 causing an excessive pelvic stroke during the collision. Both of these incidents are not desirable and would cause the design shown in FIG. 11 to fail second test 606.

Figure 8:
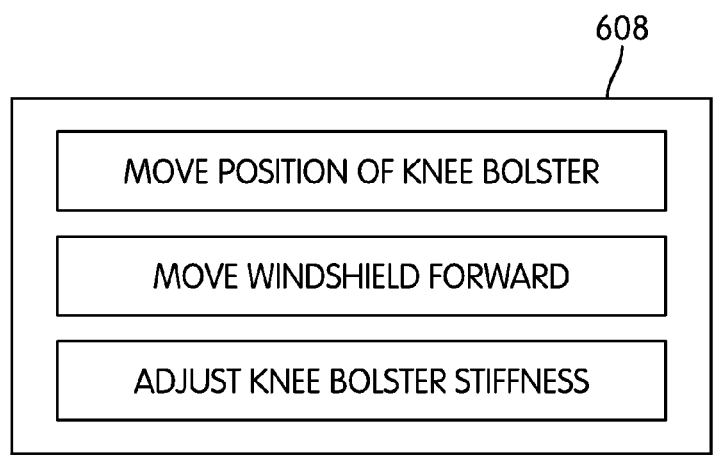
FIG. 8 is an enlarged schematic diagram of a preferred embodiment of step 608 of FIG. 6.

Because the motor vehicle failed second test 606, the process would move to step 608 where stage two modifications can be made. FIG. 8 is an enlarged view of step 608, and from FIG. 8, there are preferably three available stage two modifications that can be made. The Knee Bolster (K/B) 1108 can be moved; the windshield 1106 can be moved forward and away from the occupant; and finally the stiffness of knee bolster 1108 can be adjusted. One or more of the stage two modifications can be made, and eventually the goal is to design the motor vehicle to pass second test 606.

FIG. 12 is a preferred embodiment of an example of a motor vehicle that passes second test 606. In FIG. 12, crash test dummy 1200 moves from a first position 1202 prior to the collision to a second position 1204 after the collision. It can be observed in FIG. 12, that crash test dummy 1200 clears windshield 1006 and no head contact with windshield 1006 occurs. It can also be observed that re-designed knee bolster 1208 helps to manage the motion of pelvis 1206 to acceptable levels.

After motor vehicle 100 passes second test 606, the process proceeds to third test 610 where an Out Of Position (OPP) child passenger is tested with a delayed firing inflatable restraint. In a preferred embodiment, the firing delay is about 20 to 30 milliseconds. Again, like other tests, a C6Y (child, six year old) dummy can be used for third test 610. If motor vehicle 100 fails third test 610, then the process moves to step 612, where stage three modifications, including tuning the passenger side inflatable restraint can be made. After the inflatable restraint has been tuned, the process returns to third test 610. Preferably, this is done until motor vehicle 100 passes third test 610.

After motor vehicle 100 passes third test 610, the process moves on to fourth test 614. Fourth test 614 determines whether motor vehicle 100 can protect occupants during a frontal 40 km/h collision who are not wearing their seat belts. Preferably, both a hypothetical male occupant and a hypothetical female occupant are tested in fourth test 614. In some embodiments, an AM50% crash test dummy (which stands for American Male, 50 percentile) is used to model the behavior of a hypothetical male and an AF5% crash test dummy (which stands for American Female 5 percentile) is used to model the behavior of a hypothetical female occupant.

Figure 9:
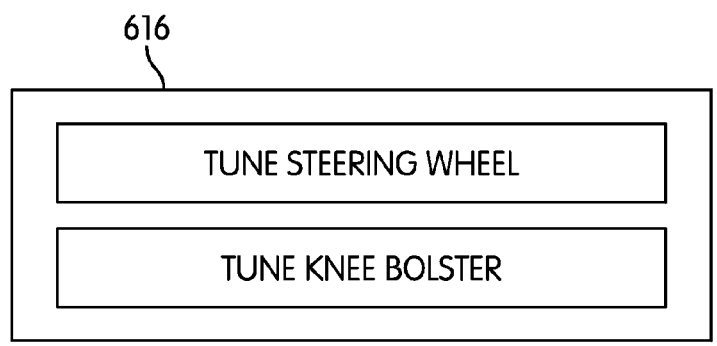
FIG. 9 is an enlarged schematic diagram of a preferred embodiment of step 616 of FIG. 6.

If motor vehicle 100 fails fourth test 614, then the process moves to step 616 where stage four modifications can be made. FIG. 9 is an enlarged view of step 616. Preferably, stage four modifications include the optional modifications of tuning the steering wheel and tuning the driver's side knee bolster.

In some embodiments, the size, shape, and collapsing stiffness of the steering wheel can be varied to help protect the occupants. Also, in some embodiments, the driver's side knee bolster can be repositioned and the stiffness of the driver's side knee bolster can be tuned.

The passenger side knee bolster 1108 (see FIGS. 11 and 12) can only be modified by stiffening knee bolster 1108. This is because any reduction in stiffness of passenger side knee bolster 1108 would invalidate the results of second test 606. Preferably, the process is designed so that no modification invalidates previous test results. Like other steps, the stage four modifications are preferably tuned until motor vehicle 100 passes fourth test 614.

After motor vehicle 100 passes fourth test 614, the process proceeds to fifth test 618. Fifth test 618 determines whether motor vehicle 100 can protect a male occupant during a frontal 48 km/h collision when the male occupant is wearing his seat belt. Preferably, a hypothetical male occupant is tested in fifth test 618 and in some embodiments an AM50% crash test dummy (which stands for American Male, 50 percentile) is used to model the behavior of a hypothetical male occupant.

If motor vehicle 100 fails fifth test 618, then the process moves to step 620 where stage five modifications can be made. Preferably, stage five modifications do not invalidate any of the test results from any of the previous tests. In one embodiment, stage five modifications include tuning the seat belt.

In some embodiments, the position, anchor points and/or tension of the seat belt can be adjusted to help protect the male occupant. Like other steps, the stage five modifications are preferably tuned until motor vehicle 100 passes fifth test 618.

One of the goals of method 600 is to avoid making a modification or adjustment during a current test that would invalidate a previous successful test result. At this point in the preferred embodiment of method 600, no other major modifications are available that would not invalidate previous test results and any modification could invalidate a previous successful test result. Therefore, there are no major modifications available for the remaining tests and the process attempts to confirm that motor vehicle 100 passes the next several tests.

After motor vehicle 100 passes fifth test 618, the process proceeds to sixth test 622, seventh test 624 and eighth test 626. Sixth test 622 determines whether motor vehicle 100 can adequately protect a female occupant during a frontal 48 km/h collision when the female occupant is wearing her seat belt. Preferably, a hypothetical female occupant is tested in sixth test 622 and in some embodiments an AF5% crash test dummy (which stands for American Female 5 percentile) is used to model the behavior of a hypothetical female occupant.

Seventh test 624 determines whether motor vehicle 100 can protect a male occupant during a collision with an angled barrier at 40 km/h when the male occupant is not wearing his seat belt. Preferably, a hypothetical male occupant is tested in seventh test 624 and in some embodiments an AM50% crash test dummy (which stands for American Male, 50 percentile) is used to model the behavior of a hypothetical male occupant.

Eighth test 626 determines whether motor vehicle 100 can adequately protect a female occupant during a collision with an offset barrier at 40 km/h when the female occupant is wearing her seat belt. Preferably, a hypothetical female occupant is tested in eighth test 626 and in some embodiments an AF5% crash test dummy (which stands for American Female 5 percentile) is used to model the behavior of a hypothetical female occupant.

Again, because no modifications are available, the process determines if motor vehicle 100 passes sixth test 622, seventh test 624 and eighth test 626. If motor vehicle 100 passes all of those tests, then the process proceeds to step 628 where the process concludes that motor vehicle 100 is qualified to use new firing map 300.

If motor vehicle 100 fails any one of the last three tests, then the process returns to a previous stage of modification. In some embodiments, this previous stage of modification can be determined by considering which modification would assist motor vehicle 100 in passing the failed test. Preferably, the highest stage of modification is selected with a goal of minimizing the number of tests that are invalidated. In other embodiments, this previous stage of modification is predetermined and the process moves to a certain predetermined modification stage if motor vehicle 100 fails any of the last three tests. In a preferred embodiment, the process moves to third test 610 if motor vehicle 100 fails any of the last three tests.

Although, it is preferred that the inflatable restraint include only two deployment modes, a first mode where the inflatable restraint does not deploy and a second mode where the inflatable restraint is deployed with a delay, it is possible to provide embodiments where a simultaneous deployment mode is used at some speed greater than 48 km/h. If a simultaneous deployment mode is used, it is preferred that the transition zone between the simultaneous deployment mode and any adjacent mote would not overlap with any regulation zone.

Using principles disclosed above, it is possible to provide a simplified inflatable restraint system that has more predictable characteristics, improved safety and the operation of which is easier to test and validate.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A method for preparing a motor vehicle for a crash test routine comprising a first test and a second test, wherein the first test subjects the motor vehicle to a first set of conditions and the second test subjects the motor vehicle to a second set of conditions that is different from the first set of conditions, the first test producing first test results;
   wherein first stage modifications to at least one structural component of the motor vehicle are available to help pass the first test, and wherein the first stage modifications include modifying a shape of an instrument panel associated with the motor vehicle;
   wherein passing the first test produces a first qualified motor vehicle;
   wherein the second test crashes the first qualified motor vehicle to produce second test results;
   wherein second stage modifications of at least one structural component of the first qualified motor vehicle are available to help pass the second test; and
   wherein the second stage of modifications are different from the first stage of modifications so that the first test results remain valid after making the second stage modification.

2. The method of claim 1, wherein the first test includes evaluating a hypothetical child passenger.

3. A method for preparing a motor vehicle for a crash test routine comprising a first test and a second test;
   wherein the first test subjects the motor vehicle to a first set of conditions and the second test subjects the motor vehicle to a second set of conditions that is different from the first set of conditions,
   wherein first stage modifications to the motor vehicle are provided to help pass the first test, and wherein the first stage modifications include modifying a first thigh contact point;
   wherein passing the first test produces a first qualified vehicle;
   wherein the second test occurs subsequent to the first test, wherein the second test crashes the first qualified motor vehicle to produce second test results;
   wherein second stage modifications are provided to help pass the second test; and
   wherein the second stage of modifications are distinct from the first stage modifications so that the first test results remain valid after making the second stage modification.

4. The method of claim 3, wherein the first test includes evaluating a hypothetical child passenger.

5. A method for preparing a motor vehicle for a crash test routine comprising a first test having a first set of conditions and a second test having a second set of conditions that is different from the first set of conditions:
   making at least one of first stage modifications to the motor vehicle to help pass the first test;
   passing the first test to produce a first qualified motor vehicle;
   performing the second test using the first qualified motor vehicle;
   making at least one of second stage modifications to the first qualified motor vehicle to help pass the second test to produce a second qualified motor vehicle, wherein the second stage modifications include moving a position of a knee bolster associated with the motor vehicle; and
   wherein the first stage modifications and the second stage modifications are different so that the first test results remain valid after making the second stage modification.

6. The method of claim 5, wherein the second test includes evaluating a hypothetical adult passenger.

7. A method for preparing a motor vehicle for a crash test routine comprising a first test having a first set of conditions and a second test having a second set of conditions that is different from the first set of conditions:
   providing first stage modifications that may be made to the motor vehicle to assist in passing the first test, wherein passing the first test produces a first qualified motor vehicle;
   performing the second test subsequent to the first test;
   performing the second test using the first qualified motor vehicle;
   providing second stage of modifications that may be made to the motor vehicle to assist in passing the second test, wherein the second stage modifications include adjusting a stiffness of a knee bolster associated with the motor vehicle; and
   wherein the second stage modifications differ from the first stage modifications so that the first test result remains valid after making the second stage modification.

8. The method of claim 7, wherein the second test includes evaluating a hypothetical adult passenger.

9. A method for preparing a motor vehicle for a crash test routine comprising a first test having a first set of conditions and a second test having a second set of conditions that is different from the first set of conditions, the first test producing a first test result:
   wherein first stage modifications to at least one structural component of the motor vehicle are available to help pass the first test;
   wherein passing the first test produces a first qualified motor vehicle;
   wherein second stage modifications to at least one structural component of the motor vehicle are available to help pass the second test to produce a second qualified motor vehicle, wherein second stage modifications can be made by optionally changing any one of the group consisting essentially of: moving a position of a knee bolster associated with the motor vehicle, moving a position of a windshield associated with the motor vehicle, and adjusting a stiffness of a knee bolster associated with the motor vehicle; and wherein the first stage modifications and the second stage modifications differ so that modifying the first qualified motor vehicle with the second stage modifications retains the validity of the first test result.

10. The method of claim 9, wherein the second test includes evaluating a hypothetical adult passenger.

11. A method for preparing a motor vehicle for a crash test routine comprising a first test having a first set of conditions that produces a first test result and a second test having a second set of conditions that produces a second test result:

making available first stage modifications to structural components of the motor vehicle to help pass the first test;

passing the first test to produce a first qualified motor vehicle;

performing the second test using the first qualified motor vehicle;

wherein the second test includes determining whether a hypothetical male passenger clears a windshield associated with the motor vehicle;

making available second stage modifications to at least one structural component of the motor vehicle to help pass the second test; and wherein the first stage modifications are ineligible to be second stage modifications so that the first qualified vehicle remains qualified.

12. The method of claim 11, wherein the first test includes evaluating a hypothetical child passenger.

13. A method of testing a single motor vehicle design comprising the steps of:

crash testing a first motor vehicle having the motor vehicle design under a first set of conditions to generate first crash test results;

determining if the first crash test results meet a first set of requirements to produce a first qualified motor vehicle design;

producing a first modified motor vehicle design by incorporating a first stage structural modification from a first group of available structural modifications into the motor vehicle design if the first test results do not meet the first set of requirements;

crash testing a second motor vehicle having the first qualified motor vehicle design, after the motor vehicle design meets the first set of requirements, under a second set of conditions to generate second crash test results;

determining if the second crash test results meet a second set of requirements to produce a second qualified motor vehicle design;

producing a second modified motor vehicle design by incorporating a second stage structural modification from a second group of available structural modifications into the motor vehicle design if the second crash test results do not meet the second set of requirements; and the first group of available structural modifications are excluded from the second group of available structural modifications so that the first qualified motor vehicle design remains qualified.

14. The method of claim 13, wherein the first qualified motor vehicle design includes the first modified motor vehicle design.

15. The method of claim 13, wherein the first set of conditions includes confirming that a hypothetical child occupant does not enter a No Good Zone.

16. The method of claim 13 wherein the second set of conditions includes confirming that a hypothetical out of position child occupant does not enter a No Good Zone.

17. The method of claim 13, further comprising the steps of:

crash testing a third motor vehicle having the second qualified motor vehicle design, after the motor vehicle design meets the second set of requirements, under a third set of conditions to generate third crash test results;

determining if the third crash test results meet a third set of requirements to produce a third qualified motor vehicle design;

producing a third modified motor vehicle design by incorporating a third stage structural modification from a third group of available structural modifications into the second qualified motor vehicle design if the third crash test results do not meet the second set of requirements; and the first group of available structural modifications and the second group of available structural modifications are excluded from the third group of available structural modifications so that the first qualified motor vehicle design and the second qualified motor vehicle remain qualified.

18. The method of claim 17 wherein the third set of conditions includes confirming that a hypothetical adult occupant does not enter a No Good Zone.

19. A method of testing a motor vehicle design comprising the steps of:

commencing a first stage of testing, the first stage of testing including a first set of requirements, wherein meeting the first set of requirements yields a first qualified motor vehicle design;

the first stage of testing including a first group of available structural modifications to modify the motor vehicle design to meet the first set of requirements;

determining if the motor vehicle design meets the first set of requirements;

modifying the motor vehicle design using a first modification selected from the first group of available structural modifications to produce a first modified motor vehicle design if the motor vehicle design does not meet the first set of requirements;

conducting crash tests within the first stage of testing until one of the tested motor vehicle designs meets the first set of requirements to produce the first qualified motor vehicle design;

commencing a second stage of testing using the first qualified motor vehicle design, the second stage of testing including a second set of requirements that is different from the first set of requirements, wherein meeting the second set of requirements yields a second qualified motor vehicle design;

the second stage of testing including a second group of available structural modifications to modify the first qualified motor vehicle during the second stage of testing;

modifying the first modified motor vehicle design using a second modification selected from the first group of available structural modifications to produce a second modified motor vehicle design if the first modified motor vehicle design does not meet the first set of requirements; and wherein the second group of available structural modifications are different from the first group of available structural modifications so that any modifications made to the first qualified motor vehicle design during the second stage of testing do not interfere with the ability of the first qualified motor vehicle design to meet the first set of requirements.

20. The method of claim 19, further comprising the steps of:
conducting a second crash test within the first stage of testing; and
modifying the first modified motor vehicle design using a second modification selected from the first group of available structural modifications to produce a second modified motor vehicle design if the first modified motor vehicle design does not meet the first set of requirements.

21. The method of claim 19 further comprising the steps of:
conducting a first crash test within the second stage of testing;
determining if the first qualified motor vehicle design meets the second set of requirements;
modifying the first qualified motor vehicle design using a first modification selected from the second group of available structural modifications to produce a second modified motor vehicle design if the first qualified motor vehicle design does not meet the second set of requirements; and
conducting crash tests within the first stage of testing until one of the motor vehicle designs tested during the second stage of testing meets the second set of requirements to produce the second qualified motor vehicle design.

22. The method of claim 21 further comprising the steps of:
commencing a third stage of testing using the second qualified motor vehicle design, the third stage of testing including a third set of requirements that is different from the first set of requirements and the second set of requirements, wherein meeting the third set of requirements yields a third qualified motor vehicle design;
the third stage of testing including a third group of available structural modifications to modify the second qualified motor vehicle during the third stage of testing;
wherein the third group of available structural modifications are different from the first group of available structural modifications and the second group of available structural modifications so that any modifications made to the second qualified motor vehicle design during the third stage of testing do not interfere with the ability of the first qualified motor vehicle design to meet the first set of requirements and the ability of the second qualified motor vehicle design to meet the second set of requirements;
conducting a first crash test within the third stage of testing;
determining if the second qualified motor vehicle design meets the third set of requirements;
modifying the second qualified motor vehicle design using a first modification selected from the third group of available structural modifications to produce a third modified motor vehicle design if the second qualified motor vehicle design does not meet the third set of requirements; and
conducting crash tests within the third stage of testing until one of the motor vehicle designs tested during the third stage of testing meets the second set of requirements to produce the third qualified motor vehicle design.

23. The method of claim 22, wherein the first set of requirements includes confirming that a hypothetical child passenger does not enter a No Good Zone, the second set of requirements includes confirming that a hypothetical out of position child passenger does not enter the No Good Zone, and the third set of requirements includes confirming that a hypothetical adult passenger does not enter the No Good Zone.

* * * * *